(12) United States Patent
Maher

(10) Patent No.: US 10,370,018 B1
(45) Date of Patent: Aug. 6, 2019

(54) MULTIPURPOSE CART ASSEMBLY

(71) Applicant: Raymond Maher, Delray Beach, FL (US)

(72) Inventor: Raymond Maher, Delray Beach, FL (US)

( * ) Notice: Subject to any disclaimer, the term of this patent is extended or adjusted under 35 U.S.C. 154(b) by 0 days.

(21) Appl. No.: 15/961,142

(22) Filed: Apr. 24, 2018

(51) Int. Cl.
*B62B 13/18* (2006.01)
*B62B 5/06* (2006.01)
*B62B 3/02* (2006.01)

(52) U.S. Cl.
CPC ............... *B62B 13/18* (2013.01); *B62B 3/02* (2013.01); *B62B 5/067* (2013.01); *B62B 2206/006* (2013.01)

(58) Field of Classification Search
CPC ..... B62B 13/18; B62B 3/02; B62B 2206/006; B62B 15/007; B62B 15/00
See application file for complete search history.

(56) References Cited

U.S. PATENT DOCUMENTS

| | | | |
|---|---|---|---|
| 2,521,330 A * | 9/1950 | Berra | B62B 13/18 280/11 |
| 3,900,202 A | 8/1975 | Dob | |
| 4,139,208 A | 2/1979 | Kaley | |
| 4,291,891 A | 9/1981 | Blanchette | |
| 4,863,075 A | 9/1989 | Romer | |
| 5,174,591 A * | 12/1992 | Shappell | B62B 17/04 280/20 |
| D339,440 S | 9/1993 | Dick | |
| 5,413,361 A | 5/1995 | Mosher | |
| 5,911,422 A | 6/1999 | Carpenter | |
| 6,042,122 A | 3/2000 | Mohr | |
| 7,464,943 B1 | 12/2008 | Poggioli | |
| 7,963,530 B1 | 6/2011 | Garcia | |
| 9,834,244 B2 * | 12/2017 | Hedberg | B62B 13/18 |
| 2002/0095947 A1 * | 7/2002 | Treppedi | A45C 11/20 62/457.9 |
| 2011/0181006 A1 * | 7/2011 | Heppner | B60G 11/04 280/9 |
| 2012/0013083 A1 * | 1/2012 | Pendl | B62B 1/20 280/7.14 |
| 2017/0008543 A1 * | 1/2017 | Elliott | B62B 1/004 |

* cited by examiner

Primary Examiner — Brian L Swenson

(57) ABSTRACT

A multipurpose cart assembly for use on hard and loose surfaces includes a wagon. A pair of skis is coupled to and selectively extensible from an underside of the wagon. The skis are configured to be extended from the wagon to contact a surface concurrently with wheels of the wagon being raised from the surface. A handle that is pivotally coupled to a front of the wagon comprises a plurality of nested sections and is selectively extensible. The handle is configured to be grasped in a hand of a user to pull the wagon selectively upon the wheels and the skis.

12 Claims, 5 Drawing Sheets

MULTIPURPOSE CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cart assemblies and more particularly pertains to a new cart assembly for use on hard and loose surfaces.

BRIEF SUMMARY OF THE INVENTION

An embodiment of the disclosure meets the needs presented above by generally comprising a wagon. A pair of skis is coupled to and selectively extensible from an underside of the wagon. The skis are configured to be extended from the wagon to contact a surface concurrently with wheels of the wagon being raised from the surface. A handle that is pivotally coupled to a front of the wagon comprises a plurality of nested sections and is selectively extensible. The handle is configured to be grasped in a hand of a user to pull the wagon selectively upon the wheels and the skis.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
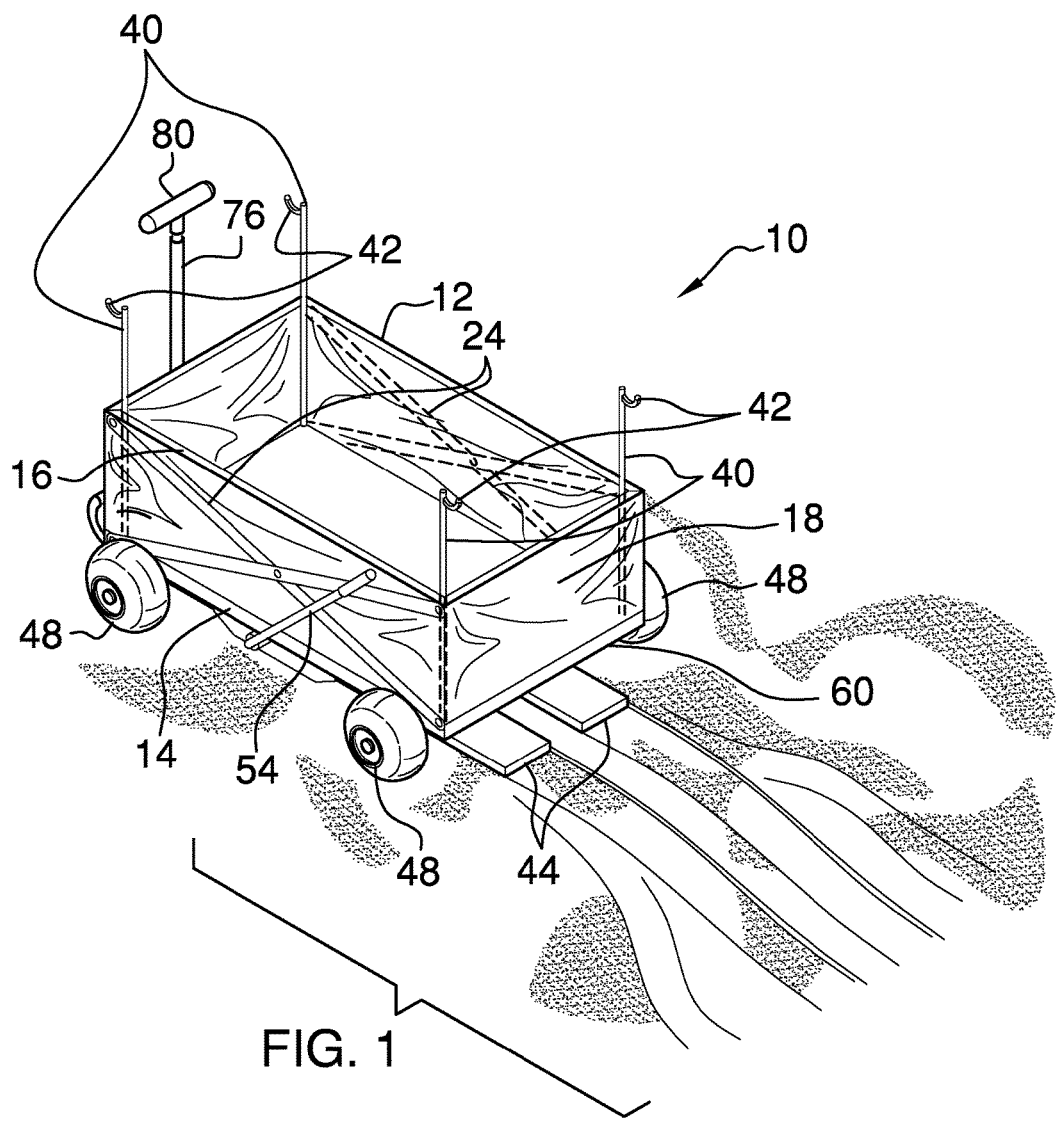
FIG. 1 is an in-use view of a multipurpose cart assembly according to an embodiment of the disclosure.
Figure 2:
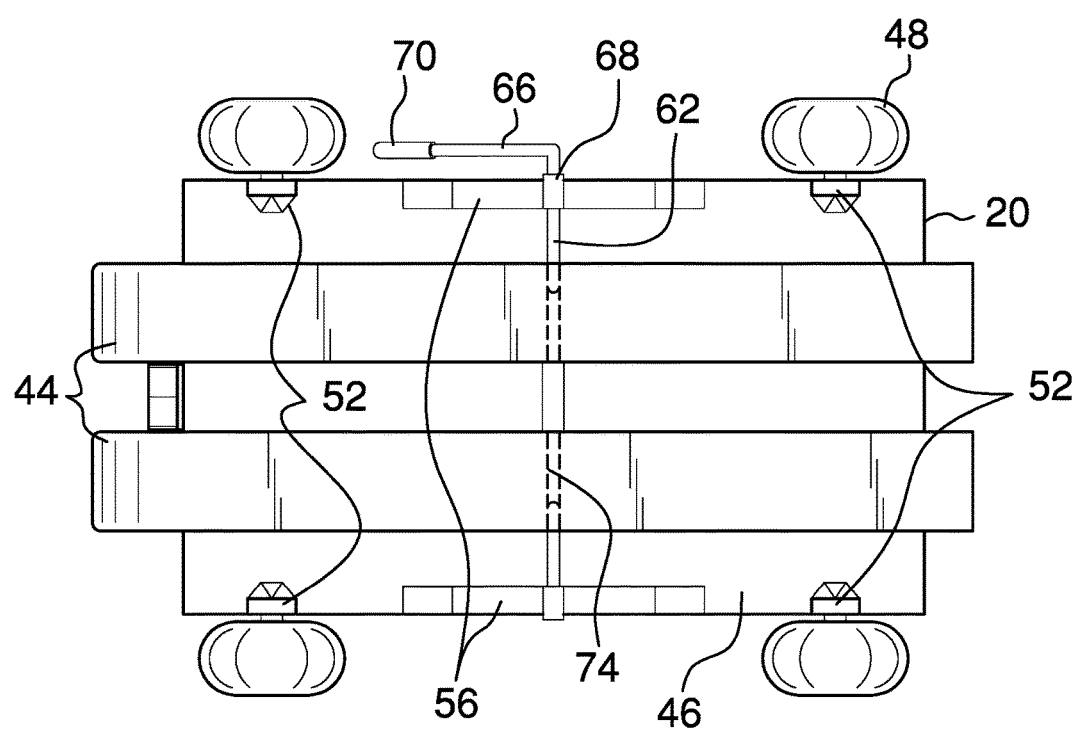
FIG. 2 is a bottom view of an embodiment of the disclosure.

With reference now to the drawings, and in particular to FIGS. 1 through 5 thereof, a new cart assembly embodying the principles and concepts of an embodiment of the disclosure and generally designated by the reference numeral 10 will be described.

As best illustrated in FIGS. 1 through 5, the multipurpose cart assembly 10 generally comprises a wagon 12. The wagon 12 comprises a plate 14, a frame 16, and a panel 18. The plate 14 is rectangularly shaped and the frame 16 is shaped complementarily to the plate 14. The panel 18 is coupled to and extends between a perimeter 20 of the plate 14 and a circumference 22 of the frame 16, as shown in FIG. 1. The panel 18 is flexible.

Each of a pair of extenders 24 is coupled to and extends between a respective opposing edge 26 of the plate 14 and an associated opposing side 28 of the frame 16. The extenders 24 are positioned to selectively position the frame 16 distally from the plate 14.

Each extender 24 comprises a pair of extension bars 30 and a coupler 32. The coupler 32 is pivotally coupled to each of the extension bars 30 at a midpoint 34 of each extension bar 30. Each extension bar 30 is coupled to and extends between a corner 36 of the plate 14 and an associated corner 38 of the frame 16, as shown in FIG. 1. The extender 24 is X-shaped when the frame 16 is positioned distally from the panel 18. The coupler 32 is selectively fixedly couplable to a respective extension bar 30 to fixedly position the pair of extension bars 30 with the frame 16 positioned distally from the panel 18. The ability of a user to collapse the wagon 12 allows the wagon 12 to be transported in a compact space, such as a trunk of a vehicle.

Each of a set of four rods 40 is selectively couplable to the plate 14 proximate to a respective corner 36 of the plate 14, as shown in FIG. 1. The rod 40 extends substantially perpendicularly from the plate 14 past the frame 16 when the frame 16 is positioned distally from the plate 14.

Each of a set of four hooks 42 is coupled to a respective rod 40 distal from the plate 14. Each hook 42 is positioned to selectively couple to a respective item of the user, such as a beach chair, to couple the item to the wagon 12.

Figure 4:
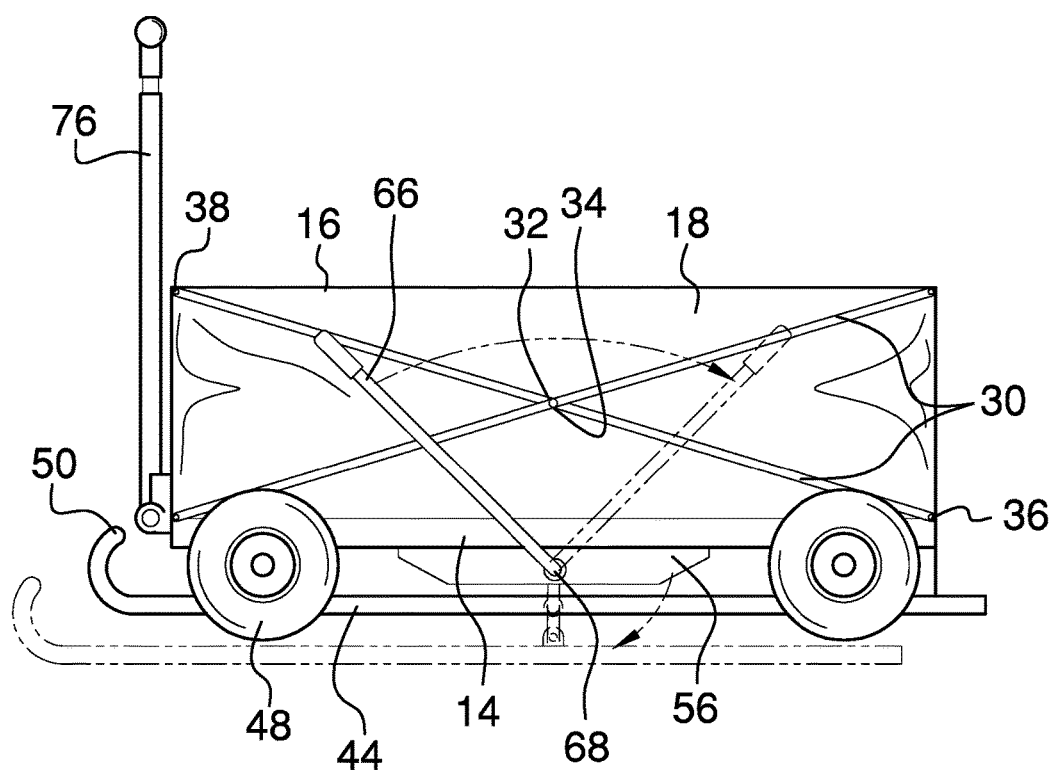
FIG. 4 is a side view of an embodiment of the disclosure.
Figure 5:
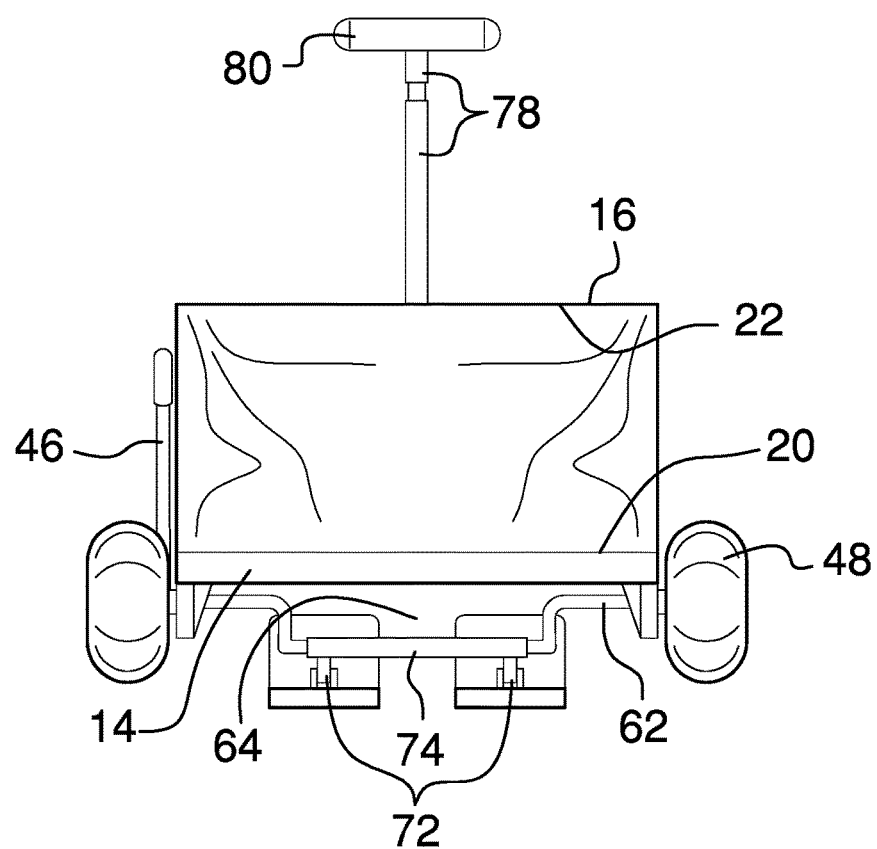
FIG. 5 is a back view of an embodiment of the disclosure.

A pair of skis 44 is coupled to and selectively extensible from an underside 46 of the wagon 12, as shown in FIG. 4. The skis 44 are configured to be extended from the wagon 12 to contact a surface concurrently with wheels 48 of the wagon 12 being raised from the surface. Each ski 44 has a front edge 50. Each ski 44 curves upwardly proximate to the front edge 50 so that the skis 44 are configured to slide on loose material, such as sand.

Each of a set of four extensions 52 is coupled to and extends from the underside 46 of the plate 14 proximate to a respective corner 36 of the plate 14. Each wheel 48 is rotationally coupled to a respective extension 52. The wheels 48 are balloon type.

An actuator 54 is coupled to the wagon 12, as shown in FIG. 4. The actuator 54 is operationally coupled to the pair of skis 44. The actuator 54 is positioned to selectively actuate the skis 44 to extend the skis 44 from the underside 46 of the wagon 12 to contact the surface concurrently with raising the wheels 48 of the wagon 12 from the surface.

The actuator 54 comprises a pair of side bars 56. Each side bar 56 is coupled to and extends from the underside 46 of the plate 14 along a respective opposing edge 26 of the plate 14 substantially equally distant from a front 58 and a back 60 of the wagon 12. A shaft 62 is rotationally coupled to and extends between the side bars 56. An offset 64 is centrally positioned in the shaft 62. A lever 66 is coupled to and extends from a terminus 68 of the shaft 62. A grip 70 is coupled to the lever 66 distal from the shaft 62. The grip 70 is configured to deter slippage of a hand of the user grasping the lever 66.

Each of a pair of connectors 72 is coupled to the center section and is pivotally coupled to a respective ski 44. The lever 66 is positioned to selectively urge a center section 74 of the shaft 62 distally from the underside 46 of the wagon 12 as the shaft 62 is rotated by the lever 66. The skis 44 are extended from the underside 46 of the wagon 12 to contact the surface concurrently with raising the wheels 48 of the wagon 12 from the surface.

Figure 3:
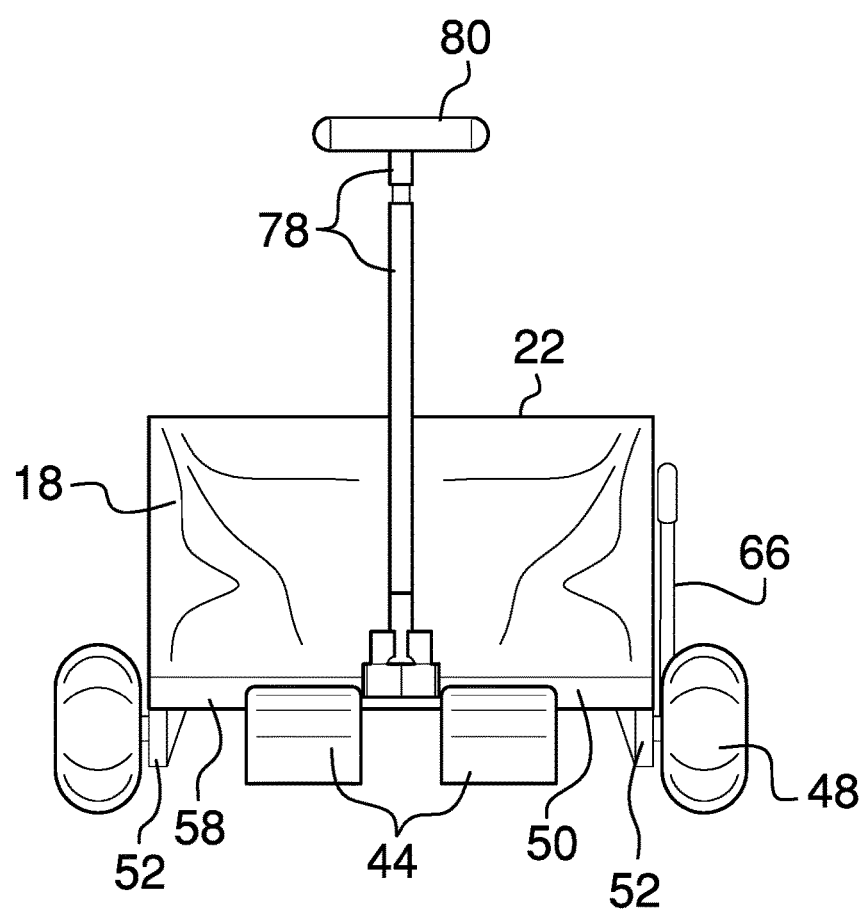
FIG. 3 is a front view of an embodiment of the disclosure.

A handle 76 is pivotally coupled to the front 58 of the wagon 12, as shown in FIG. 3. The handle 76 comprises a plurality of nested sections 78 so that the handle 76 is selectively extensible. The handle 76 is configured to be grasped in the hand of the user to pull the wagon 12 selectively upon the wheels 48 and the skis 44. A crossbar 80 is coupled to and extends bidirectionally from the handle 76 distal from the wagon 12. The crossbar 80 is configured to be grasped in the hand of the user to pull the wagon 12.

In use, the pair of extension bars 30 is fixedly positioned with the frame 16 positioned distally from the panel 18, wherein the wagon 12 is configured to position the items of the user. Depending on the terrain, the user has the option to pull the wagon on the wheels 48 when the surface is hard, such as on tarmac. To pull the wagon 12 on a loose surface, such as on the sand of a beach, the user has the option to engage the lever 66 to extend the skis 44 from the underside 46 of the wagon 12 to contact the sand concurrently with raising the wheels 48 of the wagon 12 from the sand. The handle 76 is configured to be grasped in the hand of the user to pull the wagon 12 selectively upon the wheels 48 and the skis 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multipurpose cart assembly comprising:
   a wagon, said wagon comprising
      a plate;
      a frame shaped complementarily to said plate,
      a panel coupled to and extending between a perimeter of said plate and a circumference of said frame, said panel being flexible, and
      a pair of extenders, each said extender being coupled to and extending between a respective opposing edge of said plate and an associated opposing side of said frame wherein said extenders are positioned for selectively positioning said frame distally from said plate;
   a pair of skis coupled to and selectively extensible from an underside of said wagon wherein said skis are configured for extending from said wagon for contacting a surface concurrent with raising wheels of said wagon from the surface; and
   a handle pivotally coupled to a front of said wagon, said handle comprising a plurality of nested sections such that said handle is selectively extensible wherein said handle is configured for grasping in a hand of a user for pulling said wagon selectively upon said wheels and said skis.

2. The assembly of claim 1, further including each said extender comprising a pair of extension bars and a coupler, said coupler being pivotally coupled to each of said extension bars at a midpoint of each said extension bar, each said extension bar being coupled to and extending between a corner of said plate and an associated corner of said frame such that said extender is X-shaped when said frame is positioned distally from said panel, said coupler being selectively fixedly couplable to a respective said extension bar for fixedly positioning said pair of extension bars with said frame positioned distally from said panel.

3. The assembly of claim 1, further including said plate being rectangularly shaped.

4. The assembly of claim 1, further including comprising:
   a set of four rods, each said rod being selectively couplable to said plate proximate to a respective said corner of said plate such that said rod extends substantially perpendicularly from said plate past said frame when said frame is positioned distally from said plate; and
   a set of four hooks, each said hook being coupled to a respective said rod distal from said plate wherein each said hook is positioned for selectively coupling to a respective item of the user for coupling the item to said wagon.

5. The assembly of claim 1, further including each said ski having a front edge, each said ski curving upwardly proximate to said front edge such that said skis are configured for sliding on loose material.

6. The assembly of claim 1, further including a set of four extensions, each said extension being coupled to and extending from said underside of said plate proximate to a respective said corner of said plate, each said wheel being rotationally coupled to a respective said extension.

7. The assembly of claim 1, further including said wheels being balloon type.

8. The assembly of claim 1, further including an actuator coupled to said wagon, said actuator being operationally coupled to said pair of skis wherein said actuator is positioned for selectively actuating said skis for extending said skis from said underside of said wagon for contacting the surface concurrent with raising said wheels of said wagon from the surface.

9. The assembly of claim 8, further including said actuator comprising:
   a pair of side bars, each said side bar being coupled to and extending from said underside of said plate along a respective said opposing edge of said plate substantially equally distant from said front and a back of said wagon;
   a shaft rotationally coupled to and extending between said side bars;
   a lever coupled to and extending from a terminus of said shaft;
   an offset centrally positioned in said shaft; and
   a pair of connectors, each said connector being coupled to said center section and pivotally coupled to a respective said ski wherein said lever is positioned for selectively urging a center section of said shaft distally from said underside of said wagon as said shaft is rotated by said lever such that said skis are extended from said underside of said wagon for contacting the surface concurrent with raising said wheels of said wagon from the surface.

10. The assembly of claim 9, further including a grip coupled to said lever distal from said shaft wherein said grip is configured for deterring slippage of the hand of the user grasping said lever.

11. The assembly of claim 1, further including a crossbar coupled to and extending bidirectionally from said handle distal from said wagon wherein said crossbar is configured for grasping in the hand of the user for pulling said wagon.

12. A multipurpose cart assembly comprising:
   a wagon, said wagon comprising:
      a plate, said plate being rectangularly shaped,
      a frame shaped complementarily to said plate,
      a panel coupled to and extending between a perimeter of said plate and a circumference of said frame, said panel being flexible, and
      a pair of extenders, each said extender being coupled to and extending between a respective opposing edge of said plate and an associated opposing side of said frame wherein said extenders are positioned for selectively positioning said frame distally from said plate, each said extender comprising a pair of extension bars and a coupler, said coupler being pivotally coupled to each of said extension bars at a midpoint of each said extension bar, each said extension bar being coupled to and extending between a corner of said plate and an associated corner of said frame such that said extender is X-shaped when said frame is positioned distally from said panel, said coupler being selectively fixedly couplable to a respective said extension bar for fixedly positioning said pair of extension bars with said frame positioned distally from said panel;
   a set of four rods, each said rod being selectively couplable to said plate proximate to a respective said corner of said plate such that said rod extends substantially perpendicularly from said plate past said frame when said frame is positioned distally from said plate;
   a set of four hooks, each said hook being coupled to a respective said rod distal from said plate wherein each said hook is positioned for selectively coupling to a respective item of the user for coupling the item to said wagon;
   a pair of skis coupled to and selectively extensible from an underside of said wagon wherein said skis are configured extending from said wagon for contacting a surface concurrent with raising wheels of said wagon from the surface, each said ski having a front edge, each said ski curving upwardly proximate to said front edge such that said skis are configured for sliding on loose material;
   a set of four extensions, each said extension being coupled to and extending from said underside of said plate proximate to a respective said corner of said plate, each said wheel being rotationally coupled to a respective said extension, said wheels being balloon type;
   an actuator coupled to said wagon, said actuator being operationally coupled to said pair of skis wherein said actuator is positioned for selectively actuating said skis for extending said skis from said underside of said wagon for contacting the surface concurrent with raising said wheels of said wagon from the surface, said actuator comprising:
      a pair of side bars, each said side bar being coupled to and extending from said underside of said plate along a respective said opposing edge of said plate substantially equally distant from a front and a back of said wagon,
      a shaft rotationally coupled to and extending between said side bars,
      a lever coupled to and extending from a terminus of said shaft,
      an offset centrally positioned in said shaft, and
      a pair of connectors, each said connector being coupled to said center section and pivotally coupled to a respective said ski wherein said lever is positioned for selectively urging a center section of said shaft distally from said underside of said wagon as said shaft is rotated by said lever such that said skis are extended from said underside of said wagon for contacting the surface concurrent with raising said wheels of said wagon from the surface;
   a handle pivotally coupled to said front of said wagon, said handle comprising a plurality of nested sections such that said handle is selectively extensible wherein said handle is configured for grasping in a hand of a user for pulling said wagon selectively upon said wheels and said skis;
   a grip coupled to said lever distal from said shaft wherein said grip is configured for deterring slippage of the hand of the user grasping said lever;
   a crossbar coupled to and extending bidirectionally from said handle distal from said wagon wherein said crossbar is configured for grasping in the hand of the user for pulling said wagon.

* * * * *